Patented Oct. 3, 1922.

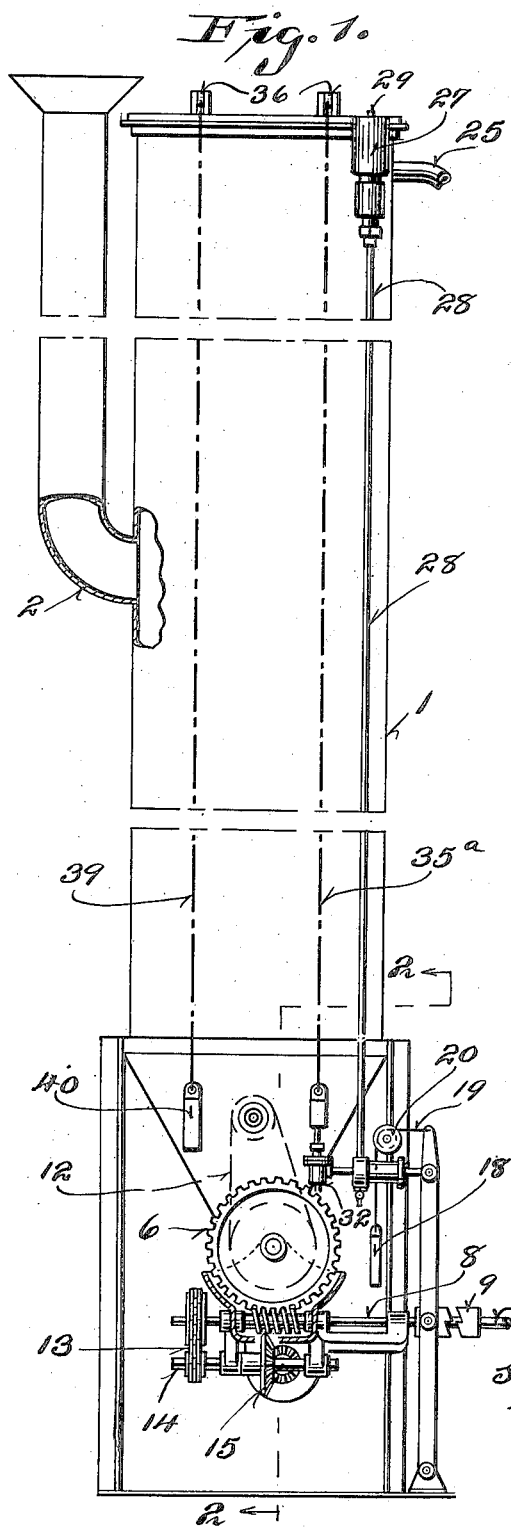

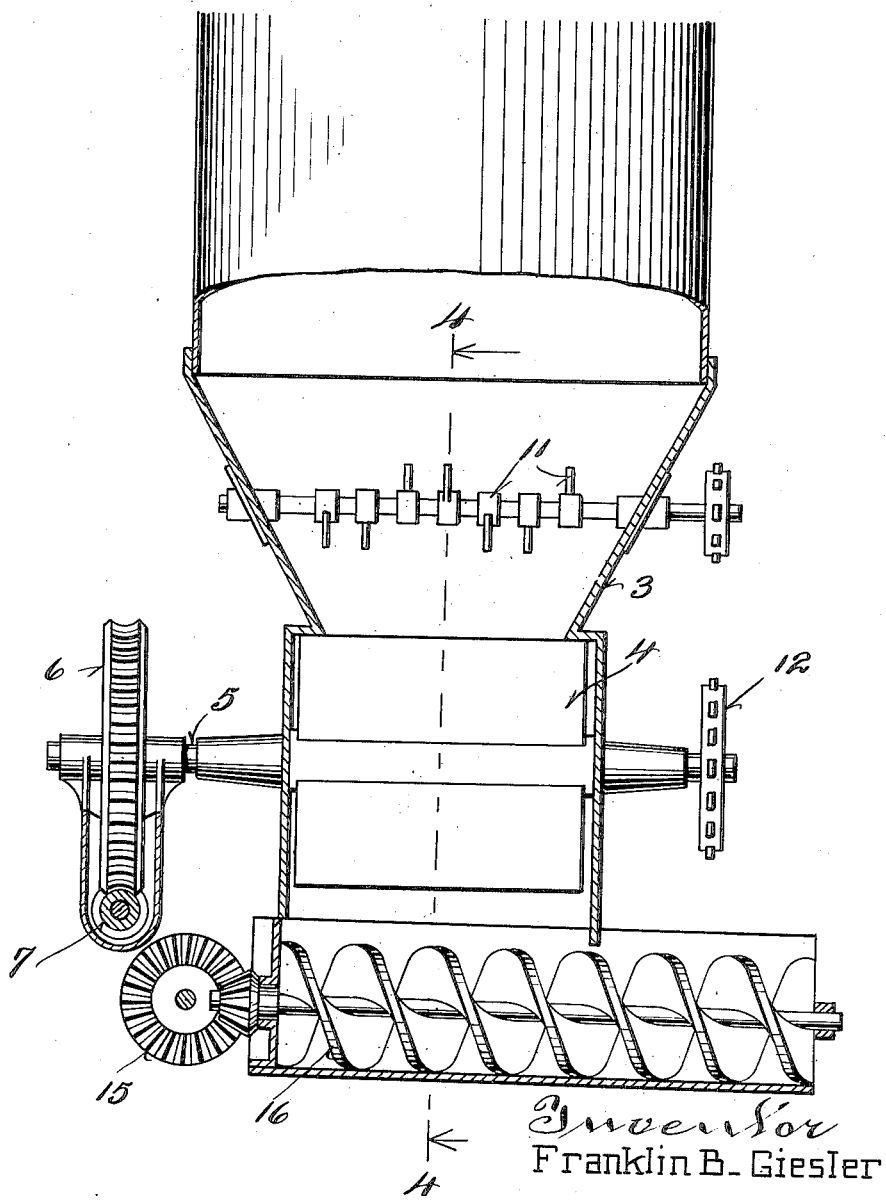

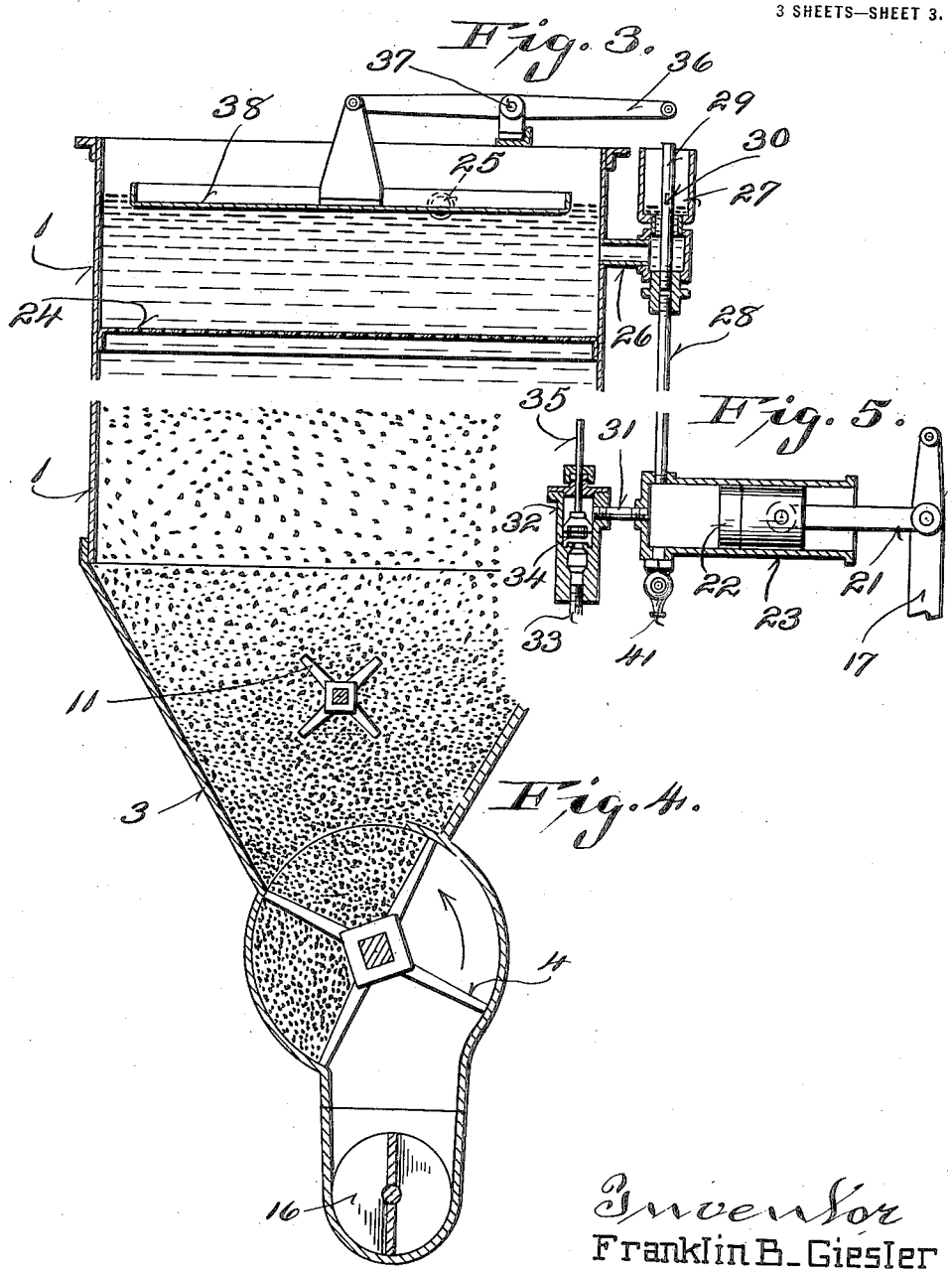

1,430,638

UNITED STATES PATENT OFFICE.

FRANKLIN B. GIESLER, OF MILWAUKEE, WISCONSIN, ASSIGNOR TO OSCAR J. ZIEGLER, OF LOS ANGELES, CALIFORNIA.

SEPARATING APPARATUS.

Application filed December 8, 1921. Serial No. 520,797.

*To all whom it may concern:*

Be it known that I, FRANKLIN B. GIESLER, a citizen of the United States, and resident of Milwaukee, in the county of Milwaukee and State of Wisconsin, have invented certain new and useful Improvements in Separating Apparatus; and I do hereby declare that the following is a full, clear, and exact description thereof.

Our invention relates to a new and useful separating apparatus, which is particularly adapted for use in connection with chemical processes for the recovery of metals from the ores, as for example, in the cyanide process for the recovery of gold.

In carrying out a process of this kind, the ore is crushed and ground, and then subjected to various treatments, whereby the metals are subjected to the action of reagents which convert the same into soluble metallic salts.

In the cyanide process, the ground ore, after being mixed with a solution of potassium cyanide, is passed through the several agitating aerating and wash towers, and is finally delivered to the separating or dehydrating tower where it stands for some time, and the sand and slime for the most part, settles to the bottom, and the pregnant solution overflows from the top of the tower. This solution may then be further settled, if necessary, and the gold subsequently precipitated by the usual method.

The general object of the invention is to provide an apparatus for use in connection with the settling or dehydrating tower which will automatically deliver the solution from the upper part thereof, and the sand and slime from the lower part in the proper proportions and at the proper rate, to secure the best results.

The structure of our improved apparatus will be better understood upon reference to the accompanying drawings, in which—

Figure 1 is a side elevation of the tower with our invention applied, thereto.

Figure 2 is a vertical sectional view substantially on the line 2—2 of Figure 1.

Figure 3 is a vertical sectional view through the upper part of the tower.

Figure 4 is a vertical sectional view on the line 4—4 of Figure 2.

Figure 5 is a sectional detailed view through the fluid controlled means for actuating the discharge mechanism, and Figure 6 is a sectional view through the lower part of the tower, showing a modified form of discharge mechanism.

In the drawings, the tower is designated by the numeral 1, and connected to the tower somewhat above the center, thereof, is an inlet pipe 2, through which the mixture is introduced into the tower. The tower is usually about 40 feet in height, and the mixture of ground ore and cyanide is introduced at the rate of 3 or 4 cubic feet per minute, so that in starting the plant, it will require from 3 to 8 hours to fill the tower to a point where the solution will overflow from the top.

After the process is in operation, the relative flow will afford time for the greater part of the sand and other undissolved matter to settle to the bottom of the tower where it will be under a hydrostatic pressure of approximately 18 lbs. to the square inch.

The lower end of the tower is convergent, as shown at 3, and the hydrostatic pressure will pack the sediment so that a minimum amount of the gold bearing solution will remain therein. This sediment is removed by the discharging mechanism which includes a paddle wheel 4, or the like, mounted on a shaft 5, which is provided at one end with a worm gear 6, which is driven by a worm 7 on the end of a shaft 8. This shaft is operatively connected by a clutch 9, with a main drive shaft 10.

During the process, the high pressure will cause the sediment to become firmly packed in the lower end of the tower, and it is, therefore, found advisable to employ an agitator to loosen up the same, so that it will pass readily through the discharge opening at the bottom. This agitator, which is designated by the numeral 11, is connected by sprocket gearing 12 to the shaft 5, so as to rotate simultaneously therewith.

The shaft 8 is also connected by sprocket gearing 13 with a counter-shaft 14, which is operatively connected by the gearing 15 to a conveyor 16, which conveys the sediment to a suitable point of discharge, where it may be subjected to a further washing, if this is found to be profitable.

The clutch which controls the operation of the discharge mechanism is operated by means of a lever 17, which is normally held by the weight 18, and cable 19, which passes over the sheave 20 in a position which will maintain the clutch disengaged. The lever 17 is automatically operated to throw the clutch into engaging position by hydrostatic pressure. The mechanism by which this pressure is rendered operative, includes a piston 21 connected to the upper end of the lever 17, and which carries a piston head 22, which operates within the cylinder 23. As the level of the liquid inside the tower rises, it passes up through the strainer 24, and reaches the level of the overflow pipe 25. Liquid also passes through the lateral opening 26 into a chamber 27, which is connected to the upper end cf a regulating pipe 28, the latter being connected at its lower end with the head of the cylinder 23.

When the rate of overflow exceeds a predetermined amount, a portion of the liquid will flow through the opening 30 into the regulating pipe. The upper end 29 of this pipe is adjustable, as shown, so as to regulate the level of the opening 30, in order that the automatic operation of the discharge mechanism will be brought about at the proper time.

When the clutch has been engaged by this automatic mechanism, the sediment will be discharged from the lower end of the tower, and the level of the liquid in the tower will be lowered. It then becomes desirable to release the hydrostatic pressure on the piston head 22, and permit the lever 17, under influence of the weight 18, to disengage the clutch and discontinue the operation of the discharge mechanism. The release of this hydrostatic pressure takes place through the relief pipe 31, the valve box 32 and the outlet pipe 33. The passage into the outlet pipe 33 is controlled by a valve 34, connected through the stem 35 to a cable 35ª. The upper end of the cable is connected to one end of a lever 36 which is fulcrumed at 37, and has its other end connected with a float 38, the position of which is determined by the height of the liquid in the tower. The float may be held in its lowermost position by means of a cable 39, and weight 40.

The head of the cylinder 23 is also provided with a pet cock 41, by means of which the hydrostatic pressure therein, may be manually relieved when desired.

A modified form of discharge mechanism is shown in Figure 6, which comprises a spiral blade 42, mounted on a vertical shaft 44, and also provided with agitating fins 43. By this means, the sediment is discharged through the chute 45 on to the conveyor 46, which is driven from shaft 44 by means of bevel gearing 47.

By means of the mechanism above described, the proportionate discharge of sediment from the bottom of the tower and of liquid through the overflow pipe 25, will be automatically regulated and the proportion may be varied to suit the character of the mixture by means of regulating the height of the section 29 and the opening 30 therein. When the liquid overflows faster than the predetermined rate, a portion of the excess will flow downwardly into the cylinder 23, and the hydrostatic pressure produced thereby, will throw the clutch into engagement and cause the sediment discharging mechanism to operate. The liquid level in the tower will be immediately lowered, causing the relief valve to open whereupon the discharge mechanism will cease to operate. Thus a nice balance will be maintained at all times between the sediment discharging mechanism and the liquid flow.

Ordinarily with the predetermined proportion of ground ore in the mixture, and with the height of the opening 30 properly adjusted, the mechanism will operate automatically without any further attention.

If it is found, at any time however, that the proportion of sediment in the tower becomes too small or too great for the most efficient operation of the process, the automatic operation of the discharge mechanism may be prevented by opening the pet cock 41, or by opening the relief valve manually, by pulling on the chain 39. On the other hand, the discharge mechanism may be caused to operate manually by pulling on the cable 35ª, or the lever 17 may be operated manually in either direction, if desired.

I claim:

1. In an apparatus of the class described, a settling tower having a discharge mechanism at its lower end, an overflow pipe connected with the upper end, a regulating pipe connected with the upper end, and means operable by hydrostatic pressure in the regulating pipe for operating said discharge mechanism.

2. In an apparatus of the class described, a settling tower having a discharge mechanism at its lower end, an overflow pipe connected with the upper end, a regulating pipe connected with the upper end, means operable by hydrostatic pressure in the regulating pipe for operating said discharge mechanism, and means for releasing said hydrostatic pressure when the level of the liquid in the tower is lowered to a predetermined point.

3. In an apparatus of the class described, a settling tower having a rotary discharge mechanism for sand and slime at its lower end, a liquid outlet pipe at its upper end, a regulating pipe connected with the upper end, a drive shaft, a clutch for connecting the drive shaft to said discharge mechanism, a piston connected with the clutch and operable by hydrostatic pressure in said regulating pipe to throw said clutch into engagement.

4. In an apparatus of the class described, a settling tower having a rotary discharge mechanism for sand and slime at its lower end, a liquid outlet pipe at its upper end, a regulating pipe connected with the upper end, means for adjusting the height of the inlet end of said regulating pipe, a drive shaft, a clutch for connecting the drive shaft to said discharge mechanism, a piston connected with the clutch and operable by hydrostatic pressure in said regulating pipe to throw said clutch into engagement.

5. In an apparatus of the class described, a settling tower having a rotary discharge mechanism for sand and slime at its lower end, a liquid outlet pipe at its upper end, a regulating pipe connected with the upper end, a drive shaft, a clutch for connecting the drive shaft to said discharge mechanism, a piston connected with the clutch and operable by hydrostatic pressure in said regulating pipe to throw said clutch into engagement, a float in said tower, and a valve for relieving the hydrostatic pressure acting on said piston, said valve being operable by said float when the level of the liquid in the tower reaches a predetermined minimum.

6. In an apparatus of the class described, a settling tower having a rotary discharge mechanism for sand and slime at its lower end, a liquid outlet pipe at its upper end, a regulating pipe connected with the upper end, means for adjusting the height of the inlet end of said regulating pipe, a drive shaft, a clutch for connecting the drive shaft to said discharge mechanism, a piston connected with the clutch and operable by hydrostatic pressure in said regulating pipe to throw said clutch into engagement, a float in said tower and a valve for relieving the hydrostatic pressure acting on said piston, said valve being operable by said float when the level of the liquid in the tower reaches a predetermined minimum.

In testimony that I claim the foregoing I have hereunto set my hand at Milwaukee, in the county of Milwaukee and State of Wisconsin.

FRANKLIN B. GIESLER.